United States Patent
Yu

(10) Patent No.: US 9,013,162 B2
(45) Date of Patent: Apr. 21, 2015

(54) APPARATUS AND METHOD FOR SUPPLYING POWER TO 300 PIN MSA 40 GB TRANSPONDER

(75) Inventor: Xueyu Yu, Shenzhen (CN)

(73) Assignee: ZTE Corporation (CN)

( * ) Notice: Subject to any disclaimer, the term of this patent is extended or adjusted under 35 U.S.C. 154(b) by 174 days.

(21) Appl. No.: 13/702,641

(22) PCT Filed: Oct. 29, 2010

(86) PCT No.: PCT/CN2010/078264
§ 371 (c)(1),
(2), (4) Date: Dec. 7, 2012

(87) PCT Pub. No.: WO2011/153782
PCT Pub. Date: Dec. 15, 2011

(65) Prior Publication Data
US 2013/0088282 A1    Apr. 11, 2013

(30) Foreign Application Priority Data
Jun. 9, 2010   (CN) .......................... 2010 1 0199447

(51) Int. Cl.
G05F 1/00 (2006.01)
G05F 3/08 (2006.01)
H04B 10/50 (2013.01)

(52) U.S. Cl.
CPC ............... G05F 3/08 (2013.01); H04B 10/503 (2013.01); H04B 10/506 (2013.01)

(58) Field of Classification Search
USPC ................. 323/241, 273–276, 283; 341/110; 370/366; 398/158, 159
See application file for complete search history.

(56) References Cited

U.S. PATENT DOCUMENTS

2005/0029998 A1* 2/2005 Brachmann et al. .......... 323/283
2006/0267564 A1* 11/2006 Badami ........................ 323/274

(Continued)

FOREIGN PATENT DOCUMENTS

CN    101520669    9/2009
CN    101521541    9/2009

(Continued)

OTHER PUBLICATIONS

International Search Report for International Patent Application No. PCT/CN2010/078264, mailed Mar. 31, 2011.

(Continued)

*Primary Examiner* — Adolf Berhane
*Assistant Examiner* — Gary Nash
(74) *Attorney, Agent, or Firm* — McAndrews, Held & Malloy, Ltd.

(57) ABSTRACT

The disclosure provides a method and an apparatus for supplying power to a 300 PIN MSA 40 Gb TRANSPONDER. The apparatus comprises a power control module (31), a second resistor ($R_2$), a third resistor ($R_3$) and a compensation circuit. The power control module (31) comprises an output terminal (311) and a reference voltage terminal (312). The output terminal (311) supplies power to the 300 PIN MSA 40 Gb TRANSPONDER through an Adaptable Power Supply (APS) Digital pin (33) of the 300 PIN MSA 40 Gb TRANSPONDER. The reference voltage terminal (312), one terminal of the second resistor ($R_2$), one terminal of the third resistor ($R_3$) and one terminal of the compensation circuit are connected with each other. The other terminal of the second resistor ($R_2$) is connected with an APS Set pin (35) of the 300 PIN MSA 40 Gb TRANSPONDER. The other terminal of the third resistor ($R_3$) is connected with an APS Sense pin (34) of the 300 PIN MSA 40 Gb TRANSPONDER. The other terminal of the compensation circuit is grounded. By virtue of the method and the apparatus, the selection range of the power control chip can be enlarged and the development cost can be reduced.

6 Claims, 3 Drawing Sheets

(56) References Cited

U.S. PATENT DOCUMENTS

2007/0029983 A1* 2/2007 Jiang et al. .................. 323/274
2008/0067987 A1* 3/2008 Tung et al. .................. 323/271

FOREIGN PATENT DOCUMENTS

| CN | 101646291 | 2/2010 |
|---|---|---|
| CN | 101867288 | 10/2010 |
| EP | 2472743 A1 | 12/2009 |

OTHER PUBLICATIONS

Reference Dodument for 300 PIN 40Gb Transponder [Online]. 300PIN MSA, XP008154598, Jul. 19, 2002, http://www.300pinmsa.org/html/documents.html.

* cited by examiner

APPARATUS AND METHOD FOR SUPPLYING POWER TO 300 PIN MSA 40 GB TRANSPONDER

TECHNICAL FIELD

The disclosure relates to the field of communications, and in particular to an apparatus and a method for supplying power to a 300 PIN Multi-Source Agreement (MSA) 40 Gb TRANSPONDER.

BACKGROUND

A 300 PIN MSA 40 Gb TRANSPONDER protocol, i.e., REFERENCE DOCUMENT FOR 300PIN 40 Gb TRANSPONDER, requires that a single board can provide an Adaptable Power Supply (APS) for the 300 PIN MSA 40 Gb TRANSPONDER, wherein a voltage range of the APS is 1.2V to 2.5V. This protocol provides a connection block diagram of the APS and the 300 PIN MSA 40 Gb TRANSPONDER, as shown in FIG. 1. According to the protocol, pins between the APS and the 300 PIN MSA 40 Gb TRANSPONDER comprise 4 signals, which are respectively APS Digital, APS SENSE, APS SET and GND. The APS Digital is used for supplying power to the 300 PIN MSA 40 Gb TRANSPONDER. The APS SET is used for setting an adjustment point of an output voltage of the APS. The APS SENSE signal is used for providing remote sensing for an output voltage (APS POWER). Correspondingly, there are 4 pins between the APS and the 300 PIN MSA 40 Gb TRANSPONDER, respectively being an APS Digital pin, an APS SENSE pin, an APS SET pin and a GND pin.

As shown in FIG. 2, FIG. 1 can be simplified in order to facilitate the prediction and understanding. A calculation formula of $V_{APS\_Digital}$ can be obtained from FIG. 2:

$$V_{APS\_Digital} = V\text{sense} \times R3/(R2+R1) + V\text{sense} \quad \text{formula (1)}$$

As shown in Table 1, the protocol regulates a corresponding relationship between an output $V_{APS\_Digital}$ and a resistor R1.

TABLE 1

| R1 resistance value (Ω) | Vout (V) |
| --- | --- |
| 1530 | 1.2 |
| 672 | 1.5 |
| 330 | 1.8 |
| 0 | 2.5 |

The Vout in Table 1 is $V_{APS\_Digital}$. According to the corresponding relationship between the R1 resistance value and the $V_{APS\_Digital}$ regulated in Table 1, the 300PIN 40 Gb TRANSPONDER protocol provides a parameter selection, which can satisfy the corresponding relationship, as follows: Vsense=0.8V, R2=470Ω, R3=1000Ω. If only using a power control chip, of which a reference voltage (namely, $V_{feedback}$ in the figure) is 0.8V, to supply power to the 300 PIN MSA 40 Gb TRANSPONDER, a selection range of the power control chip is too narrow.

SUMMARY

The disclosure provides an improved apparatus and method for supplying power to a 300 PIN MSA 40 Gb TRANSPONDER, which solves at least one of the problems that the selection range is too narrow when selecting the power control chip which supplies power to the 300 PIN MSA 40 Gb TRANSPONDER in related technologies.

An apparatus for supplying power to a 300 PIN MSA 40 Gb TRANSPONDER is provided according to one aspect of the disclosure.

An apparatus for supplying power to the 300 PIN MSA 40 Gb TRANSPONDER according to the disclosure comprises: a power control module, a resistor R2, a resistor R3 and a compensation circuit, wherein: the power control module comprises an output terminal and a reference voltage terminal; the output terminal is configured to supply power to an Adaptable Power Supply (APS) Digital pin of a 300 PIN MSA 40 Gb TRANSPONDER; the reference voltage terminal, one terminal of the resistor R2, one terminal of the resistor R3 and one terminal of the compensation circuit are connected together; the other terminal of the resistor R2 is connected with an APS Set pin of the 300 PIN MSA 40 Gb TRANSPONDER; the other terminal of the resistor R3 is connected with an APS Sense pin of the 300 PIN MSA 40 Gb TRANSPONDER; and the other terminal of the compensation circuit is grounded.

A method for supplying power to a 300 PIN MSA 40 Gb TRANSPONDER is provided according to another aspect of the disclosure.

The method for supplying power to a 300 PIN MSA 40 Gb TRANSPONDER according to the disclosure comprises: selecting a power control module; supplying power to a 300 PIN MSA 40 Gb TRANSPONDER by connecting an output terminal of the power control module to an Adaptable Power Supply (APS) Digital pin of the 300 PIN MSA 40 Gb TRANSPONDER; wherein a reference voltage terminal of the power control module, one terminal of a resistor R2, one terminal of a resistor R3 and one terminal of a compensation circuit are connected together; the other terminal of the resistor R2 is connected with an APS Set pin of the 300 PIN MSA 40 Gb TRANSPONDER; the other terminal of the resistor R3 is connected with an APS Sense pin of the 300 PIN MSA 40 Gb TRANSPONDER; and the other terminal of the compensation circuit is grounded.

Through the disclosure, the restriction of the APS power control chip (that Vsense is less than 0.8V) is removed by using a current compensation method on the basis of Kirchhoff's current law. The problem that the selection range is too narrow when selecting the power control chip which supplies power to the 300 PIN MSA 40 Gb TRANSPONDER in the related technologies is solved, thus enlarging the selection range of the power control chip, and reducing the development cost.

Other characteristics and advantages of the disclosure are described in the following specifications, and are partially obvious in the specifications, or are understood by implementing the disclosure. Other advantages of the disclosure can be implemented and obtained via the specifications, claims and the structures specifically pointed out in the drawings.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

It should be noted that, the embodiments of the application and the characteristics of the embodiments can be mutually combined under the condition of no conflict. The disclosure is described below with reference to the drawings and embodiments in details.

Figure 3:
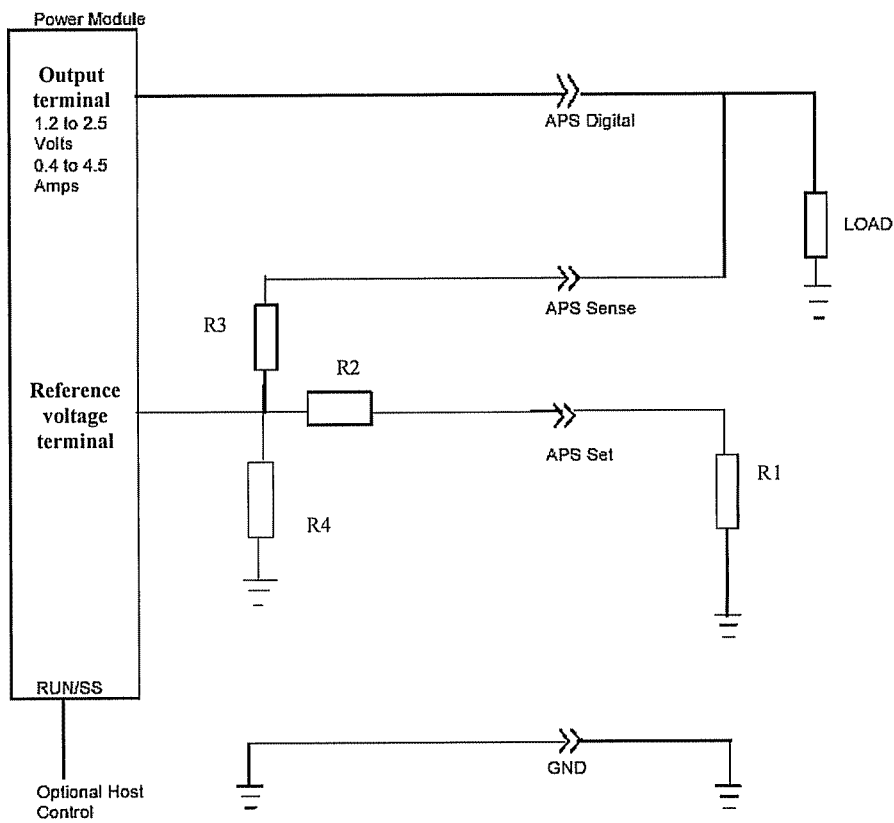
FIG. 3 shows a connection diagram of an apparatus for supplying power to a 300 PIN MSA 40 Gb TRANSPONDER according to an embodiment of the disclosure.

FIG. 3 shows a diagram of an apparatus for supplying power to a 300 PIN MSA 40 Gb TRANSPONDER according to an embodiment of the disclosure. As shown in FIG. 3, the apparatus for supplying power to the 300 PIN MSA 40 Gb TRANSPONDER comprises: a power control module 30, a resistor R2 32, a resistor R3 34 and a compensation circuit 36.

In the above, the power control module 30 comprises an output terminal 300 and a reference voltage terminal 302. The output terminal 300 is configured to supply power to an APS Digital pin of the 300 PIN MSA 40 Gb TRANSPONDER. The reference voltage terminal 302, one terminal of the resistor R2 32, one terminal of the resistor R3 34 and one terminal of the compensation circuit 36 are connected together.

The other, terminal of the resistor R2 32 is connected with an APS Set pin of the 300 PIN MSA 40 Gb TRANSPONDER. The other terminal of the resistor R3 34 is connected with an APS Sense pin of the 300 PIN MSA 40 Gb TRANSPONDER. The reference voltage terminal 302 is connected with one terminal of the compensation circuit 36, and the other terminal of the compensation circuit 36 is grounded.

The above power control module can be a power control chip of which the input reference voltage (Vsense) is not limited to be 0.8V required in the protocol. The power control module can be a power control chip of which the input reference voltage is less than 0.8V. By adopting the current compensation technical measures, the above apparatus not only can satisfy the requirements on the performances of the APS required by the TRANSPONDER in the 300PIN 40 Gb TRANSPONDER protocol, but also can break through the limitation of selecting the APS control chip (Vsense=0.8V) for supplying power to the 300 PIN MSA 40 Gb TRANSPONDER, thus enabling the developers select power control chips in a larger selection range.

Preferably, the above compensation circuit can be a resistor R4. In a specific implementation process, the compensation circuit is not limited to adopt one resistor, but also can use multiple resistors, or adopt a circuit which consists of other elements.

The above compensation circuit is simple, easy to be implemented, and has low cost.

Preferably, an output voltage of the output terminal of the power control module 30 ranges from 1.2V to 2.5V, an output current of the output terminal of the power control module 30 ranges from 0.4 A to 4.5 A, and an input reference voltage of the reference voltage terminal is less than 0.8V.

As one compensation circuit is connected to the reference voltage terminal, one terminal of the resistor R2 and one terminal of the resistor R3, the power control chip, of which the Vsense (namely, the input voltage of the reference voltage terminal) is less than 0.8V, can implement the APS power by using the current compensation method. The description is made below with reference to FIG. 4.

Figure 4:
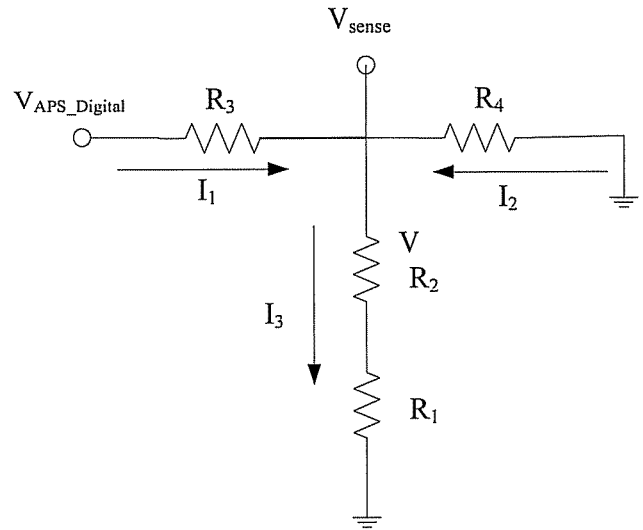
FIG. 4 shows a schematic diagram when the Kirchhoff's current law is applied in the circuit in which the APS and the 300 PIN MSA 40 Gb TRANSPONDER is connected according to an embodiment of the disclosure.

FIG. 4 shows a schematic diagram when the Kirchhoff's current law is applied in the circuit in which the APS and the 300 PIN MSA 40 Gb TRANSPONDER is connected according to an embodiment of the disclosure. A current flowing through R3 is I1, a current flowing through the compensation circuit is I2, and a current flowing through R2 and R1 is I3.

The following equations can be obtained according to the Kirchhoff's current law:

$I1=(V_{APS\_Digital}-Vsense)/R3$;

$I2=-Vsense/R4$;

$I3=Vsense/(R1+R2)$;

wherein a definition based on the Kirchhoff's current law is as follows: a sum of the current flowing towards a certain node is equal to the sum of the current flowing out from the node at any time. $I3=I1+I2$ can be obtained from the Kirchhoff's current law.

The following formula can be derived from FIG. 4 and each above equation:

$$V_{APS\_Digital}=R3*Vsense/(R2+R1)+R3*Vsense/R4+Vsense \quad \text{formula (2)}$$

In formula (2), the output voltage of the APS is still the sum of a voltage drop of R3 and the Vsense voltage, and the current value flowing through R3 is the sum of the current flowing through R2 and the current flowing through R4.

It can be seen that, the resistance values of the resistor R2, the resistor R3 and the resistor R4 have a certain functional relationship with a resistance to ground (R1) of the APS Set pin and an input voltage ($V_{APS\_Digital}$) of the APS Digital pin.

During a preferable implementation process, an appropriate Vsense voltage and base voltage can be selected. Supposing that R2, R3 and R4 are variables, R1 is a constant, one set of values of R2, R3 and R4 can be obtained (generally, the value of R2 can be selected as the standard value provided by the protocol, namely, 470Ω) by inputting the values of R1 and Vout according to the Table 1.

The process of determining the resistance values of R2, R3 and R4 is described below based on an example.

For example, Vsense=0.64V, the following four equations can be obtained by substituting Vsense, and the values of R1 and $V_{APS\_Digital}$, which correspond with each other, in Table 1 into formula (2):

$1.2=R3*0.64/(R2+1530)+R3*0.64/R4+0.64$ $1.5=R3*0.64/(R2+672)+R3*0.64/R4+0.64$ $1.8=R3*0.64/(R2+330)+R3*0.64/R4+0.64$ $2.5=R3*0.64/(R2+0)+R3*0.64/R4+0.64$

Suppose that R2 is equal to 470 (according to the standard value provided by the protocol), it can be obtained that R3 is equal to 1250 and R4 is equal to 5000 from the above four equations.

Additionally, in order to better discuss whether the performance requirements on APS in the 300 PIN MSA 40 Gb TRANSPONDER protocol is satisfied when using the above method, a further demonstration is provided with reference to the above example.

$$V_{APS\_Digital}=Vsense*R3/(R2+R1)+Vsense \quad \text{formula (1)}$$

By substituting the reference voltage (Vsense) of 0.8V required in the protocol and the corresponding R3=1000 ohm and R2=470 ohm into formula (1), the following formula can be obtained:

$$V_{APS\_Digital}=800/(470+R1)+0.8 \qquad \text{formula (3)}$$

By comparing formula (3) with formula (2), the following formula can be obtained:

$$R3=800/V\text{sense} \qquad \text{formula (4)}$$

$$R4=800/(0.8-V\text{sense}) \qquad \text{formula (5)}$$

Suppose that Vsense is equal to 0.64 v, it can be obtained that R3=1250 ohm and R4=5000 ohm according to the formula (4) and the formula (5). Further, according to the values of R3 and R4, and formula (2), the following formula can be obtained by derivation:

$$V_{APS\_Digital}=800/(470+R1)+0.8 \qquad \text{formula (6)}$$

Via comparison, formula (3) and formula (6) are completely the same, thus, the above method can fully satisfy the performance requirements on the APS in the 300 PIN MSA 40 Gb TRANSPONDER protocol in a case that Vsense is less than 0.8V.

Figure 5:
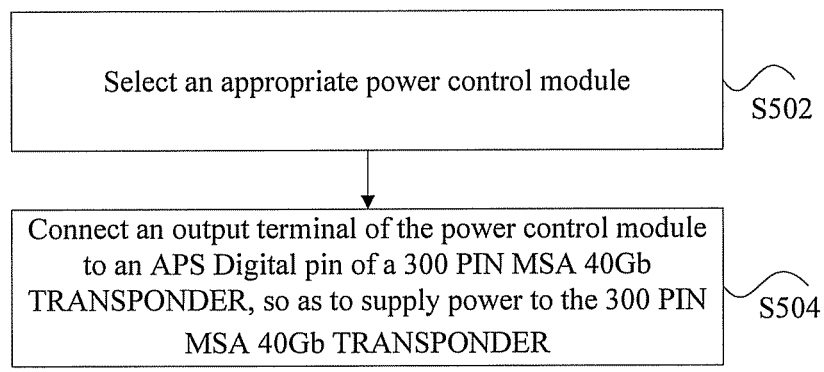
FIG. 5 shows a flowchart of a method for supplying power to a 300 PIN MSA 40 Gb TRANSPONDER according to an embodiment of the disclosure.

FIG. 5 shows a flowchart of a method for supplying power to a 300 PIN MSA 40 Gb TRANSPONDER according to an embodiment of the disclosure. As shown in FIG. 5, the method comprises the following steps.

Step S502: an appropriate power control module is selected.

In the step, the above power control module can be a power control chip of which the input reference voltage is not limited to be 0.8V required in the protocol. The power control module can be a power control chip of which the reference input voltage is less than 0.8V, therefore, the selection range of the power control chip is enlarged.

Step S504, power is supplied to the 300 PIN MSA 40 Gb TRANSPONDER by connecting an output terminal of the power control module with an APS Digital pin of the 300 PIN MSA 40 Gb TRANSPONDER.

In the step, a reference voltage terminal of the power control module, one terminal of a resistor R2, one terminal of a resistor R3 and one terminal of a compensation circuit are connected together; the other terminal of the resistor R2 is connected with an APS Set pin of the 300 PIN MSA 40 Gb TRANSPONDER; the other terminal of the resistor R3 is connected with an APS Sense pin of the 300 PIN MSA 40 Gb TRANSPONDER; the other terminal of the compensation circuit is grounded.

By adopting the current compensation technical measures, the above method not only can satisfy the requirements on the performances of the APS required by the TRANSPONDER in the 300PIN 40 Gb TRANSPONDER protocol, but also can break through the limitation of selecting the APS control chip (Vsense=0.8V) for supplying power to the 300 PIN MSA 40 Gb TRANSPONDER, thus enabling the developers select power control modules (for example, power control chips) in a larger selection range.

Preferably, the above compensation circuit can be a resistor R4. Certainly, the compensation circuit can be other implementation modes mentioned above.

During a preferable implementation process, under a condition of selecting the resistors R2, R3 and R4 with appropriate resistance values, the output voltage of the output terminal of the power control module ranges from 1.2V to 2.5V, the output current of the output terminal of the power control module ranges from 0.4 A to 4.5 A, and the input reference voltage of the reference voltage terminal also can be less than 0.8V (for example, 0.64V as described in the above example).

The resistance values of the resistor elements can be determined via calculation, thus the selection for the power control chip is transformed to be the selection for the resistor elements, therefore, the selection range for the power control chip is enlarged, and the development cost is reduced.

Preferably, the resistance values of the resistor R2, the resistor R3 and the resistor R4 can be determined according to a resistance to ground of the APS Set pin and an input voltage of the APS Digital pin.

During a preferable implementation process, the determination of the resistance values of the resistor R2, the resistor R3 and the resistor R4 specifically comprises the following processing:

(1) multiple equations are obtained by substituting multiple sets of values of R1 and Vout into formula Vout=R3*Vsense/(R2+R1)+R3*Vsense/R4+Vsense (namely, the above formula (2)), wherein the value of R1 and the value of Vout, in each of the multiple sets of values of R1 and Vout, correspond to each other;

(2) simultaneous equations of the multiple equations are solved to obtain the resistance values of the resistor R2, the resistor R3 and the resistor R4;

wherein Vout represents the input voltage of the APS Digital pin, Vsense represents the input reference voltage, R1 represents the resistance value of the resistance to ground of the APS Set pin.

Figure 1:
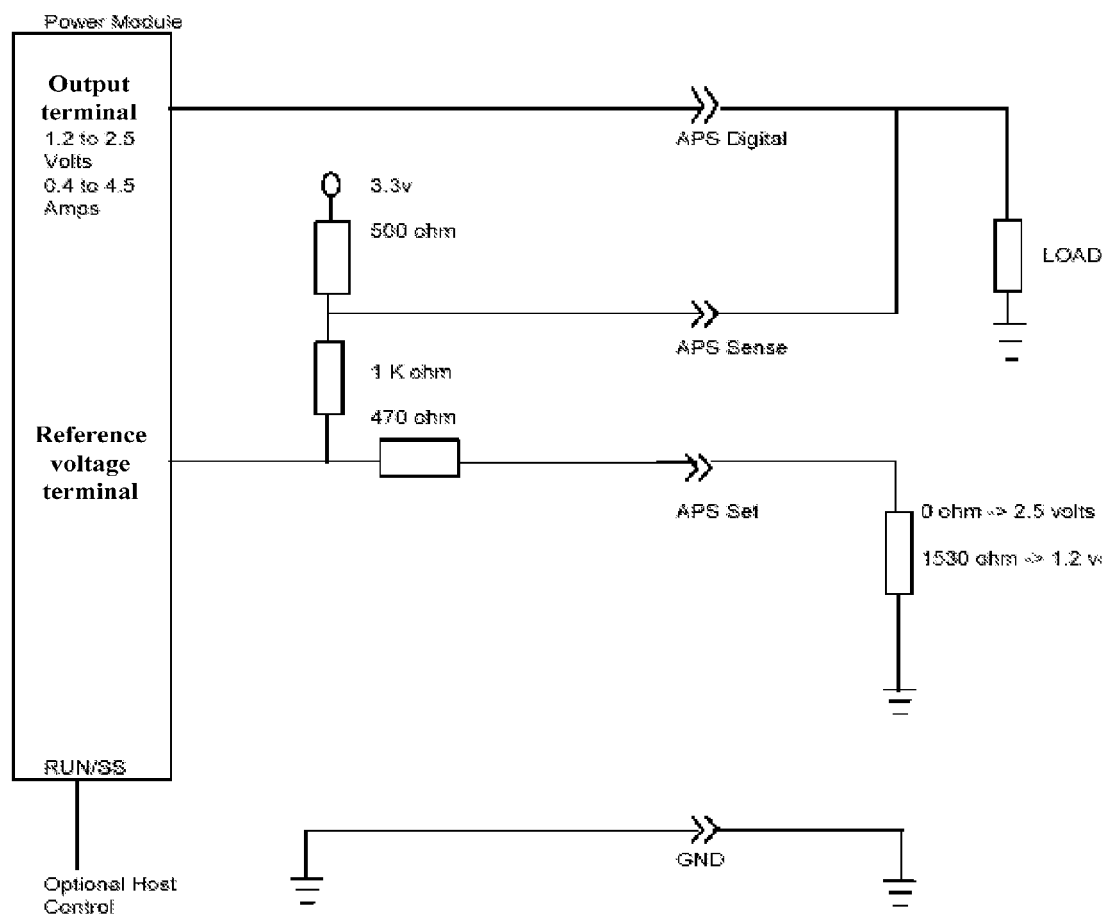
FIG. 1 shows a connection diagram of an APS and a 300 PIN MSA 40 Gb TRANSPONDER which is provided by the 300 PIN MSA 40 Gb TRANSPONDER protocol.
Figure 2:
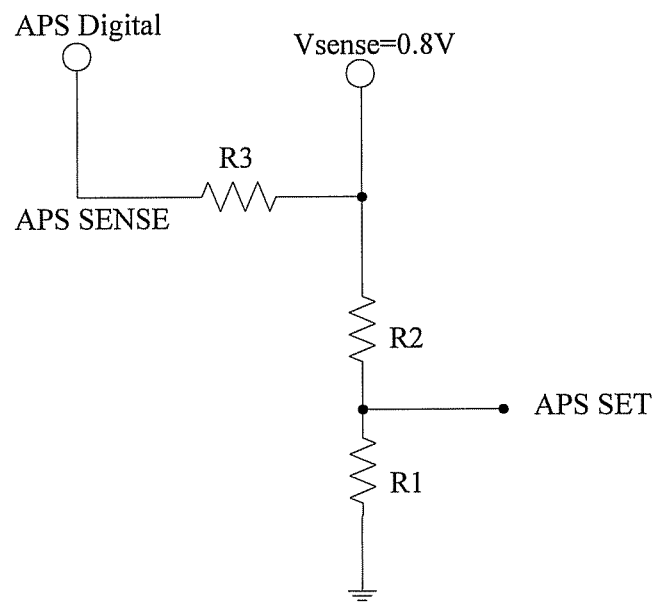
FIG. 2 shows a schematic diagram showing a principle of the connection between the APS and the 300 PIN MSA 40 Gb TRANSPONDER as shown in FIG. 1.

The circuit connection modes corresponding to the above method specifically can be referred to FIG. 2 to FIG. 4, and are not described again here.

In conclusion, by adopting the current compensation technical measures, the solution for supplying power to the 300 PIN MSA 40 Gb TRANSPONDER provided by the embodiments of the disclosure not only satisfies the performance requirements of the APS required by the TRANSPONDER in the 300PIN 40 Gb TRANSPONDER protocol, but also breaks through the limitation of selecting the APS control chip (Vsense=0.8V) for the 300 PIN MSA 40 Gb TRANSPONDER, thus the developers have larger range to select the power control chips.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. An apparatus for supplying power to the 300 PIN Multi-Source Agreement (MSA) 40 Gb TRANSPONDER, wherein the apparatus comprises a power control module, a resistor R2, a resistor R3 and a compensation circuit, wherein:

the power control module comprises an output terminal and a reference voltage terminal;

the output terminal is configured to supply power to an Adaptable Power Supply (APS) Digital pin of a 300 PIN MSA 40 Gb TRANSPONDER;

the reference voltage terminal, one terminal of the resistor R2, one terminal of the resistor R3 and one terminal of the compensation circuit are connected together;

the other terminal of the resistor R2 is connected with an APS Set pin of the 300 PIN MSA 40 Gb TRANSPONDER;

the other terminal of the resistor R3 is connected with an APS Sense pin of the 300 PIN MSA 40 Gb TRANSPONDER; and the other terminal of the compensation circuit is grounded;

wherein the compensation circuit is a resistor R4;

wherein resistance values of the resistor R2, the resistor R3 and the resistor R4 have a functional relationship with a resistance to ground of the APS Set pin and an input voltage of the APS Digital pin.

2. The apparatus according to claim 1, wherein an output voltage of the output terminal of the power control module ranges from 1.2V to 2.5V, an output current of the output terminal of the power control module ranges from 0.4 A to 4.5 A, and an input reference voltage of the reference voltage terminal is less than 0.8V.

3. The apparatus according to claim 1, wherein the functional relationship is as follows:

multiple equations which are obtained by substituting multiple sets of values of R1 and Vout into a formula: Vout=R3×Vsense/(R2+R1)+R3×Vsense/R4+Vsense, wherein a value of R1 and a value of Vout, in each of the multiple sets of values of R1 and Vout, correspond to each other;

wherein Vout represents the input voltage of the APS Digital pin, Vsense represents an input reference voltage, and R1 represents a resistance value of the resistance to ground of the APS Set pin.

4. A method for supplying power to the 300 PIN Multi-Source Agreement (MSA) 40 Gb TRANSPONDER, comprising:

selecting a power control module;

supplying power to a 300 PIN MSA 40 Gb TRANSPONDER by connecting an output terminal of the power control module to an Adaptable Power Supply (APS) Digital pin of the 300 PIN MSA 40 Gb TRANSPONDER;

wherein a reference voltage terminal of the power control module, one terminal of a resistor R2, one terminal of a resistor R3 and one terminal of a compensation circuit are connected together; the other terminal of the resistor R2 is connected with an APS Set pin of the 300 PIN MSA 40 Gb TRANSPONDER; the other terminal of the resistor R3 is connected with an APS Sense pin of the 300 PIN MSA 40 Gb TRANSPONDER; and the other terminal of the compensation circuit is grounded;

wherein the compensation circuit is a resistor R4;

wherein resistance values of the resistor R2, the resistor R3 and the resistor R4 are determined according to a resistance to ground of the APS Set pin and an input voltage of the APS Digital pin.

5. The method according to claim 4, wherein an output voltage of the output terminal of the power control module ranges from 1.2V to 2.5V, an output current of the output terminal of the power control module ranges from 0.4 A to 4.5 A, and an input reference voltage of the reference voltage terminal is less than 0.8V.

6. The method according to claim 4, wherein a process of determining the resistance values of the resistor R2, the resistor R3 and the resistor R4 comprises:

obtaining multiple equations by substituting multiple sets of values of R1 and Vout into a formula: Vout=R3×Vsense/(R2+R1)+R3×Vsense/R4+Vsense, wherein a value of R1 and a value of Vout, in each of the multiple sets of values of R1 and Vout, correspond to each other;

solving simultaneous equations of the multiple equations to obtain the resistance values of the resistor R2, the resistor R3 and the resistor R4;

wherein Vout represents the input voltage of the APS Digital pin, Vsense represents an input reference voltage, and R1 represents a resistance value of the resistance to ground of the APS Set pin.

* * * * *